United States Patent Office 2,766,121
Patented Oct. 9, 1956

2,766,121

PROCESS FOR BLEACHING AND DEODORIZING MEAT

Marcel Mouton, Saint-Die, France, assignor to Olin Mathieson Chemical Corporation, a corporation of Virginia No Drawing. Application November 14, 1951, Serial No. 256,391

2 Claims. (Cl. 99—107)

My invention relates to a new and improved process for bleaching and deodorizing proteic substances of animal or vegetable origin.

It is well known that the bleaching of proteic substances of animal or vegetable origin can be conducted either with the aid of oxygenated agents or of chlorine derivatives, or by the action of reducing compounds such as the derivatives of sulphur: sulphur dioxide, bisulphites, hydrosulphites, etc. However, the use of peroxidized agents, or persalts alone under the usual conditions can lead to extended oxidations, or to drastic alterations resulting from irreversible physico-chemical modifications of the substances so treated.

Thus for example, when pelts are treated with hydrogen peroxide it is possible to observe an impairment of the material caused by an exaggerated swelling of the proteic cells, accompanied by a deterioration which may go as far as the breaking of the tissues.

Likewise, in the treatment of intestines for tripe, or in the decoloration of these for the pork trade, the same difficulties are encountered if the usual methods of decoloration with hydrogen peroxide are used. The intense release of oxygen from the decomposition of the peroxides by the tissues themselves, the secretions which they contain, the peroxidases which develop there or the bacteria which are found there, cause swellings between the different cellular layers which, as is well known, can proceed to such an extent as to cause the formation of openings and consequently render the treated materials unfit for the use intended.

Similarly, when using known methods it is difficult to eliminate the varied colorations of the proteic substances which, as a function of the food of the animals, may go from yellow to green (the chlorophyll absorbed by ruminants from vegetable elements in particular resists digestion for quite a long time), from green to brown, from pink to the deepest ochre. Accidental colorations, due to conditions of recovery, of storing, or of preserving products, are characterized by color tones going from grey to bluish green, indicating poor preservation, without predicting, however, alterations of quality.

The action of reducing compounds used alone has given no better results than the oxygenated or chlorinated agents.

Furthermore, the use of chlorinated agents or chlorine derivatives, well known for the bleaching of numerous substances, has never heretofore led to good results for proteic substances. In addition to the fact that these agents do not exert a decoloring action on the proteides, but on the contrary, accentuate their colorings from yellow to purplish brown, they also very generally cause an appreciable alteration of the proteic substance by fixation of chlorine, modification of the molecule, even complete deterioration, depending on the pH of the reaction solutions.

My present invention makes it possible to eliminate these disadvantages while attaining the desired bleaching and deodorizing of the proteic substances.

The process of this invention is a process for bleaching and deodorizing proteic substances which is particularly suitable for use, for example, in the food industry and which comprises treating such substances with three types of suitable active agents used either successively or in combination. These three types of suitable active agents can be described as chlorine derivatives of the class of chlorites, peroxides and/or persalts, and most reducing agents.

According to my invention the operation of the process is conducted preferably in three successive stages which are: an initial treatment by a persalt of strong oxidizing power such as a persulphate, or any other compound capable of causing a perceptible ionization of the solution; an intermediate treatment by a chlorite of an alkali metal or alkaline-earth metal, preferably sodium chlorite; and a final treatment by a reducing agent such as the bisulphites, the hydrosulphites, formaldehyde, urea, and like reducing agents which have no harmful effects on the materials involved.

The present process applies to all proteic substances and in all cases the products treated are well decolorized and their properties are neither impaired nor modified. When substances designed for the food industry are treated, products free from odor and which preserve well are obtained.

It is obvious that the present invention includes a treating process in which two stages at least can be combined simultaneously, or in which the order of treating stages can be modified. This gives to the process a great flexibility of application, and in addition, makes it possible to spread the different stages of treatment out over a more or less long interval of time without disadvantage. The average time of each stage is between about one and four hours. The treatments are conducted at ordinary room temperature.

From the point of view of the deodorizing, the results obtained on substances with very characteristic odors are excellent.

The persalts or peroxides have a favorable action on the good appearance of the substances treated; the decolorizing action of the chlorites no longer has the disadvantages noted above, and the treatment by the reducing agents initiates reduction reactions which oppose the phenomena of recoloration, caused by oxidation of the amino-acids contained or formed in the substance during treatment by the chlorites.

Moreover, the present process makes it possible to work in a pH range which is much broader on the alkaline side. Whereas up to now it has been practically impossible to work on these substances with a pH exceeding 7 to 8, when employing my process it is possible to use solutions having a pH as high as 12 without substantial modifications of the products thus treated.

A few examples of the process according to my invention, treating proteic substances of different origin, are given below.

*Example I*

Small pieces of pork were first treated in a bath of ammonium persulphate at 10 g./liter. The material being treated was then allowed to drain well, and then treated in a 2 g./liter bath of sodium chlorite. After rinsing and draining it was finally treated in a 10 cc./liter bath of sodium bisulphite. (10 cc. of sodium bisulphite solution containing 380 g./liter).

Each of these three successive treatments lasted about 12 hours.

The material obtained after this treatment is homogeneous, clear, deodorized, and has excellent keeping properties.

*Example II*

Small pieces of beef, stained and fermented, were first washed in a 2 g./liter bath of sodium peroxide. They were then well rinsed and treated for 6 hours in a 10 g./liter bath of ammonium persulphate to which phosphoric acid was added in a quantity sufficient to bring the pH below 7. Then they were drained and treated for 12 hours by a bath of 2 g./liter sodium chlorite. They were finally rinsed and finished, in a period of 12 hours, in a reducing bath of: sodium bisulphite . . . 10 cc./liter (10 cc. of a sodium bisulphite solution containing 380 g./liter) and ammonium bifluoride . . . 2 cc./liter (2 cc. of an ammonium bifluoride solution containing 1.000 g./liter).

The material obtained after this treatment is homogeneous, clear, odorless, and has good keeping properties.

*Example III*

Tripe for canning, having numerous spots of chlorophyll, were first treated by a 2 g./liter bath of sodium peroxide for rapid washing. Then it was treated successively in a bath of 10 g./liter potassium persulphate for two hours at 20 degrees C. and in a 2 g./liter bath of sodium chlorite for 24 hours. It was finally washed, rinsed, and finished, in a period of 24 hours, in a 5 cc./liter reducing bath of sodium bisulphite (5 cc. of a sodium bisulphite solution containing 380 g./liter) and washed with an excess of water.

The material obtained after this treatment is completely cleared, homogeneous, completely deodorized, and has excellent keeping properties.

*Example IV*

Thin strips of pork were treated for the pork trade, as for example, sausage casings, small sausages made of chitterlings, etc., under the following conditions:

Soaking in 10 g./liter of ammonium persulphate for 8 hours.

Treatment for 12 hours in a chlorite solution containing:

Sodium chlorite . . . 2 g./liter
Hydrogen peroxide 130 vol. . . . 5 cc./liter

Reducing treatment for 6 hours with aqueous formaldehyde (40%) . . . 1 cc./liter.

The material obtained after this treatment is completely white and its physical and mechanical properties are not modified.

I claim:

1. A process for bleaching and deodorizing meat which comprises contacting the meat in aqueous medium with active agents in three successive stages to effect substantially complete decolorization and deodorization, the first stage comprising contact of the meat for a period of about 1 to 12 hours with an aqueous solution containing about 10 grams per liter of a persulfate selected from the group consisting of ammonium persulfate and potassium persulfate, the second stage comprising contact of the meat for a period of about 1 to 24 hours with an aqueous solution containing about 2 grams per liter of a chlorite selected from the group consisting of alkali metal chlorites and alkaline earth metal chlorites, and the third stage comprising contact of the meat for a period of about 1 to 24 hours with an aqueous solution containing about 5–10 cc./liter of a bisulfite solution containing about 380 grams per liter of sodium bisulfite.

2. A process in accordance with claim 1 where the chlorite is sodium chlorite.

References Cited in the file of this patent

UNITED STATES PATENTS

| | | |
|---|---|---|
| 1,412,523 | Hochstadter | Apr. 11, 1922 |
| 2,002,146 | Jensen | May 21, 1935 |
| 2,158,411 | Elion | May 16, 1939 |
| 2,430,674 | Hampel | Nov. 11, 1947 |
| 2,566,941 | Jorgensen | Sept. 4, 1951 |